(12) United States Patent
Konik et al.

(10) Patent No.: US 11,042,873 B2
(45) Date of Patent: Jun. 22, 2021

(54) BLOCKCHAIN: AUTOMATIC FORK PROTECTION

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 16/207,744

(22) Filed: Dec. 3, 2018

(65) Prior Publication Data

US 2019/0102777 A1 Apr. 4, 2019

Related U.S. Application Data

(63) Continuation of application No. 15/335,109, filed on Oct. 26, 2016, now abandoned.

(51) Int. Cl.
*G06Q 40/08* (2012.01)
*G06Q 20/38* (2012.01)
(Continued)

(52) U.S. Cl.
CPC ......... *G06Q 20/382* (2013.01); *G06Q 20/065* (2013.01); *G06Q 20/401* (2013.01);
(Continued)

(58) Field of Classification Search
None
See application file for complete search history.

(56) References Cited

U.S. PATENT DOCUMENTS

2015/0332283 A1 11/2015 Witchey
2015/0356524 A1 12/2015 Pennanen
(Continued)

OTHER PUBLICATIONS

Thompson, Collin (Dec. 21, 2015). Insurance, The Blockchain, and The Sharing Economy: Re-Imagining InsurTech with P2P Social Insurance Networks on the Blockchain (Year: 2015).*

(Continued)

*Primary Examiner* — Kito R Robinson
(74) *Attorney, Agent, or Firm* — Scully, Scott, Murphy & Presser, P.C.; David Quinn

(57) ABSTRACT

Systems and methods for providing automatic fork protection including determining that a transaction having fork protection was included in a first block that was appended to a blockchain, that a hash of the first block was validated, that a consensus decision was made by validator nodes approving the first block for addition to the blockchain, that a second block was appended to the blockchain after the first block, that the second block comprises a hash that is not based on the first block, that the first block was on a first fork and the second block was on a second fork, that the blockchain was resolved in favor of the second fork, and that the transaction failed as a result of the blockchain being resolved in favor of the second fork. The method including compensating a party that submitted the failed transaction based on the fork protection.

18 Claims, 8 Drawing Sheets

(51) Int. Cl.
  *G06Q 20/40*  (2012.01)
  *G06Q 20/06*  (2012.01)
  *H04L 9/32*   (2006.01)

(52) U.S. Cl.
  CPC .......... *G06Q 40/08* (2013.01); *H04L 9/3236* (2013.01); *H04L 2209/38* (2013.01)

(56) References Cited

U.S. PATENT DOCUMENTS

| | | |
|---|---|---|
| 2015/0379510 A1 | 12/2015 | Smith |
| 2016/0027229 A1 | 1/2016 | Spanos et al. |
| 2016/0028552 A1* | 1/2016 | Spanos ................ H04L 9/3236 713/178 |
| 2016/0098723 A1 | 4/2016 | Feeney |
| 2016/0330034 A1* | 11/2016 | Back ................... H04L 9/3255 |
| 2017/0034197 A1* | 2/2017 | Daniel ................ H04L 9/3236 |
| 2017/0228371 A1* | 8/2017 | Seger, II ............ G06F 16/2379 |
| 2017/0236123 A1* | 8/2017 | Ali ..................... G06Q 20/3825 705/75 |

OTHER PUBLICATIONS

Disclosed Anonymously, "Universal Blockchained Health Record", an IP.com Prior Art Database Technical Disclosure, pp. 1-3, dated Apr. 13, 2016.

Peters. G, "Understanding Modern Banking Ledgers through Banking Ledgers through Blockchain Technologies: Future of Transaction Processing and Smart Contracts on the Internet of Money", pp. 1-33, Nov. 19, 2015.

Von Gunten, C., "Chain of a Lifetime: How Blockchain Technology Might Transform Personal Insurance", pp. 1-51, dated Dec. 2014.

* cited by examiner

BLOCKCHAIN: AUTOMATIC FORK PROTECTION

TECHNICAL FIELD

The present disclosure relates to blockchain technology and in particular to automatic protection for users in a losing fork of a blockchain.

BACKGROUND

Blockchain technology was developed as a way of providing a publicly transparent and decentralized ledger that is configured to track and store digital transactions in a publicly verifiable, secure, and hardened manner to prevent tampering or revision.

A typical blockchain includes three primary functions: read, write, and validate. For example, a user of the blockchain must have the ability to read the data that resides on the blockchain. A user of the blockchain must also have the ability to write, e.g. append, data to the blockchain. Every write operation starts out as a proposed transaction that is posted on the network. The transaction may be submitted for addition to the blockchain by a user of the blockchain, for example, a wallet application or other application program interface (API). Once submitted, the proposed transaction is added to a pool of available transactions for addition to the blockchain. Validator nodes associated with the blockchain may then select transactions from the pool for addition to a new block.

In some cases, the transaction found in the pool may not always be valid, for example, they may be malformed (syntax errors), or may constitute an attempt to perform a task for which the submitter is not authorized. Validation refers to filtering out invalid transactions and then deciding on the exact order for the remaining, valid, transactions selected for addition to the blockchain as part of a new block. Validation is often performed by validator nodes associated with the blockchain.

Once ordered, the transactions are packaged into a new block, and the new block is voted on by the validator nodes associated with the blockchain to determine whether to add the new block to the blockchain. If a consensus to add the new block is reached, e.g., a threshold number of "for" votes, the new block may be appended to the blockchain. Each new block that is appended to the blockchain also includes a hash of the previous block. Accordingly, as each new block is added, the security and integrity of the entire blockchain is further enhanced. It is important to note that once data is written to the blockchain, for example, once a block including a set of transactions has been appended to the blockchain, that data can no longer be altered or modified. In a typical blockchain, the anonymity of the users is protected through the use of pseudonyms and the transaction data itself is protected through the use of cryptography, e.g., via the use of hash codes.

In some instances, a blockchain may fork. Forks are temporary inconsistencies between different versions of a blockchain that may occur due to the decentralized nature of the blockchain. For example, a fork may occur when a first set of validator nodes of the blockchain reach a consensus to add a first block to the blockchain while a second set of validator nodes of the blockchain reach a consensus to deny the first block from addition to the blockchain. In this case, the second set of validator nodes may instead reach consensus to add a second block to the blockchain instead of the first block. Because both the first and second blocks have reached consensus as the next block to be added to the blockchain, a "fork" has occurred where the blockchain effectively includes two different versions, one for each new block. Each side of the "fork" may then continue to grow as new blocks are added. These forks are later resolved as a result of the eventual convergence of more blocks being solved and added to one of the forks in a blockchain than the other. The longest chain wins, because of the extra difficulty in solving the extra block(s) and the blocks on the losing chain become invalid and orphaned. In some cases, transactions found in the orphaned blocks may already be included in the blocks on the winning chain, albeit in a different order than on the losing chain. In some cases, the different order of the transaction may cause a potential double-spend problem where the same coins or currency associated with the blockchain may have been spent in two transactions. For example, where each coin has a specific digital identifier, a coin with the same digital identifier may have been spent in two separate transactions.

BRIEF SUMMARY

The system, method, and computer program product described herein provide fork protection for transactions appended to a blockchain.

In an aspect of the present disclosure, a method for providing automatic fork protection in a blockchain is disclosed. The method includes receiving a notification that a transaction having fork protection has failed due to a fork in a blockchain and in response to receiving the notification, determining that the transaction having fork protection was included in a first block that was appended to the blockchain, that a hash of the first block was validated, that a consensus decision was made by validator nodes associated with the blockchain approving the first block for addition to the blockchain, that a second block was appended to the blockchain after the first block was appended to the blockchain, that the second block comprises a hash that is not based on the first block, that the first block was on a first side of a fork of the blockchain and the second block was on a second side of the fork of the blockchain based on the second block comprising a hash that is not based on the first block, and that the blockchain was resolved in favor of the second fork. The method further includes determining that the transaction failed as a result of the blockchain being resolved in favor of the second fork, and in response to the determining that the transaction failed as a result of the blockchain being resolved in favor of the second fork, compensating a party that submitted the transaction based on the fork protection.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

The present disclosure provides methods and systems for blockchain fork protection.

Figure 1:
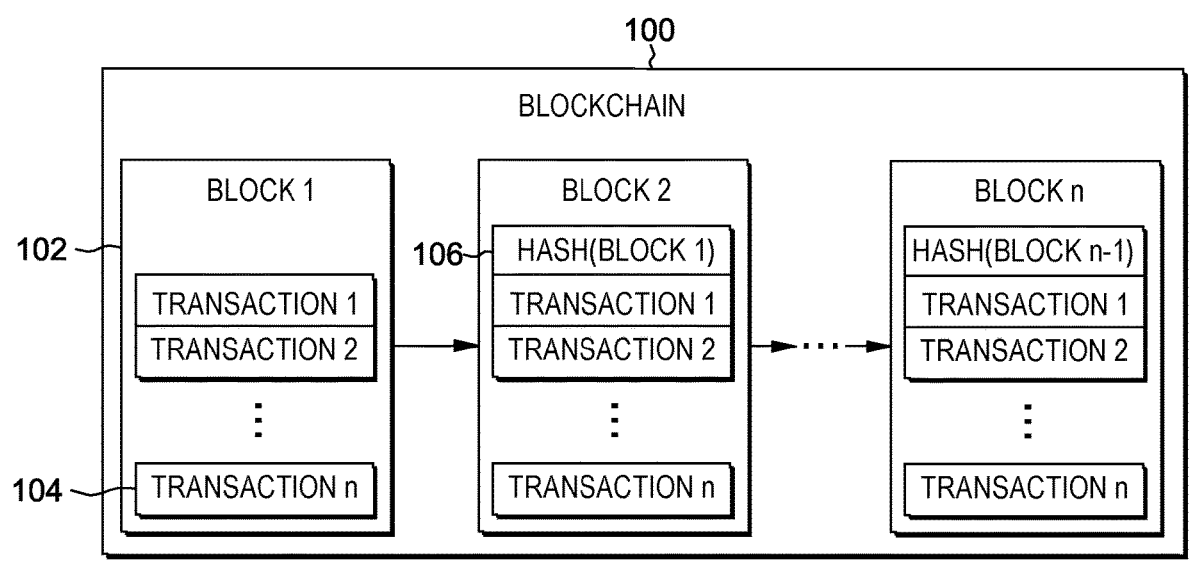
FIG. 1 is a diagram illustrating a blockchain in accordance with an aspect of the present disclosure.

With reference now to FIG. 1, a blockchain 100 includes a plurality of data blocks 102. Each data block 102 is a data structure that includes data representing transactions 104, for example, prescriptions, queries to the blockchain regarding a prescription, or any other transaction related to a prescription. As described above, as new transactions 104 are submitted to the blockchain 100 and validated by validator nodes, additional data blocks 102 are generated by the validator nodes and appended to the blockchain 100. Each new data block 102 includes a set of validated transactions 104 and a hash 106 of the content of the immediately previous data block 102. For example, data block "2" includes a hash of the content of block "1", block "n" includes a hash of the content of block "n-1", etc. Some non-limiting examples of blockchains include Bitcoin®, Ethereum®, OpenLedger™, or other similar blockchains.

Figure 2:
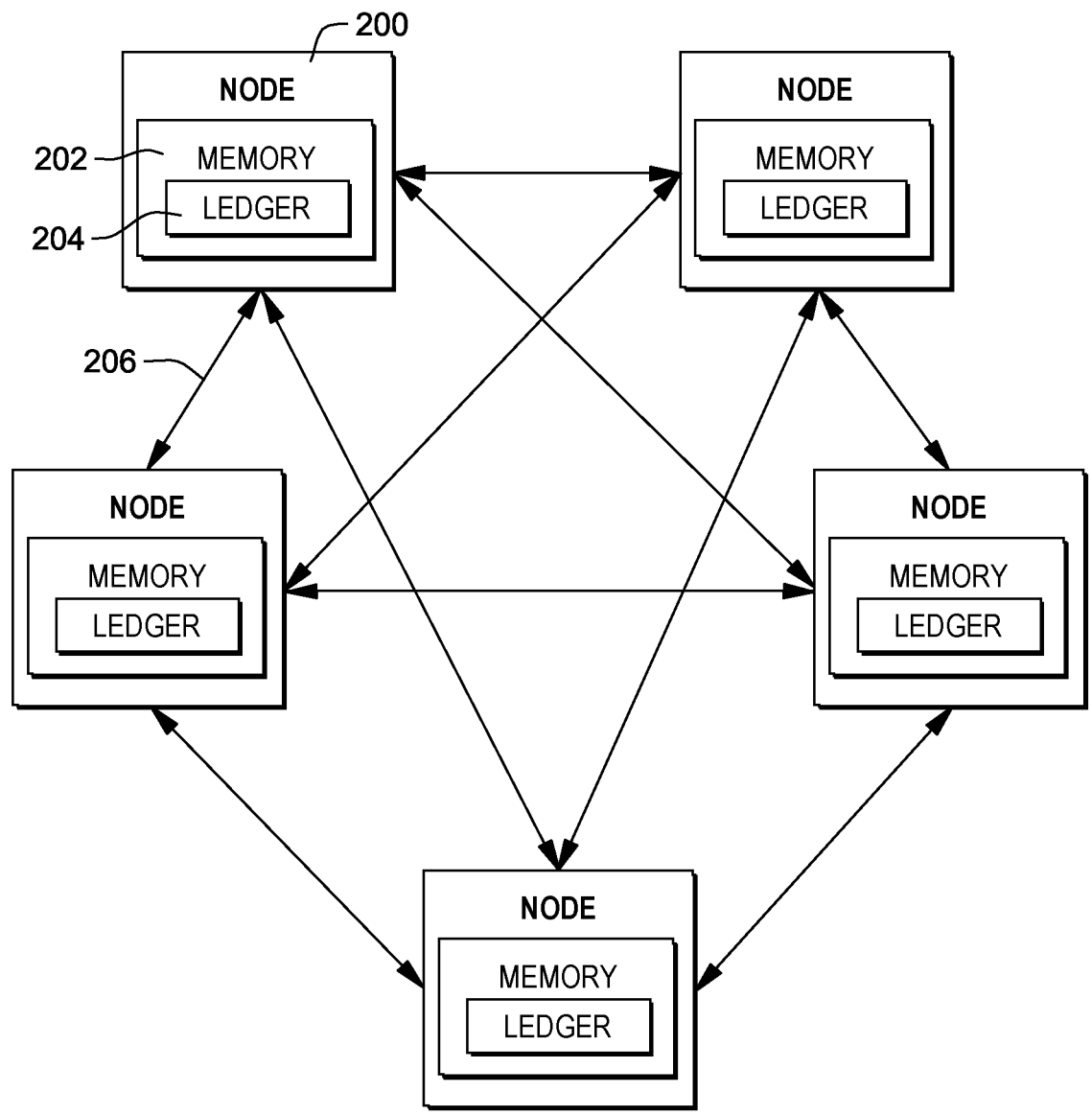
FIG. 2 is a system diagram illustrating nodes associated with the blockchain of FIG. 1 and storing the ledger of the blockchain of FIG. 1 in accordance with an aspect of the present disclosure.

With reference now to FIG. 2, in some aspects, blockchain 100 is stored in a decentralized manner on a plurality of nodes 200, e.g., computing devices located in one or more networks. Nodes 200 may each include a memory 202 that stores at least a portion of a ledger 204 of blockchain 100. Ledger 204 includes any data blocks 102 that have been validated and added to the blockchain 100. In some aspects, every node 200 may store the entire ledger 204. In some aspects, each node 200 may store a portion of ledger 204. In some aspects, some or all of blockchain 100 may be stored in a centralized manner. Nodes 200 may communicate with one another via communication pathways 206, e.g., wired or wireless connections, over the internet, etc. to transmit and receive data related to ledger 204. For example, as new data blocks 102 are added to ledger 204, nodes 200 may communicate or share the new data blocks 102 via communication pathways 206.

Figure 3:
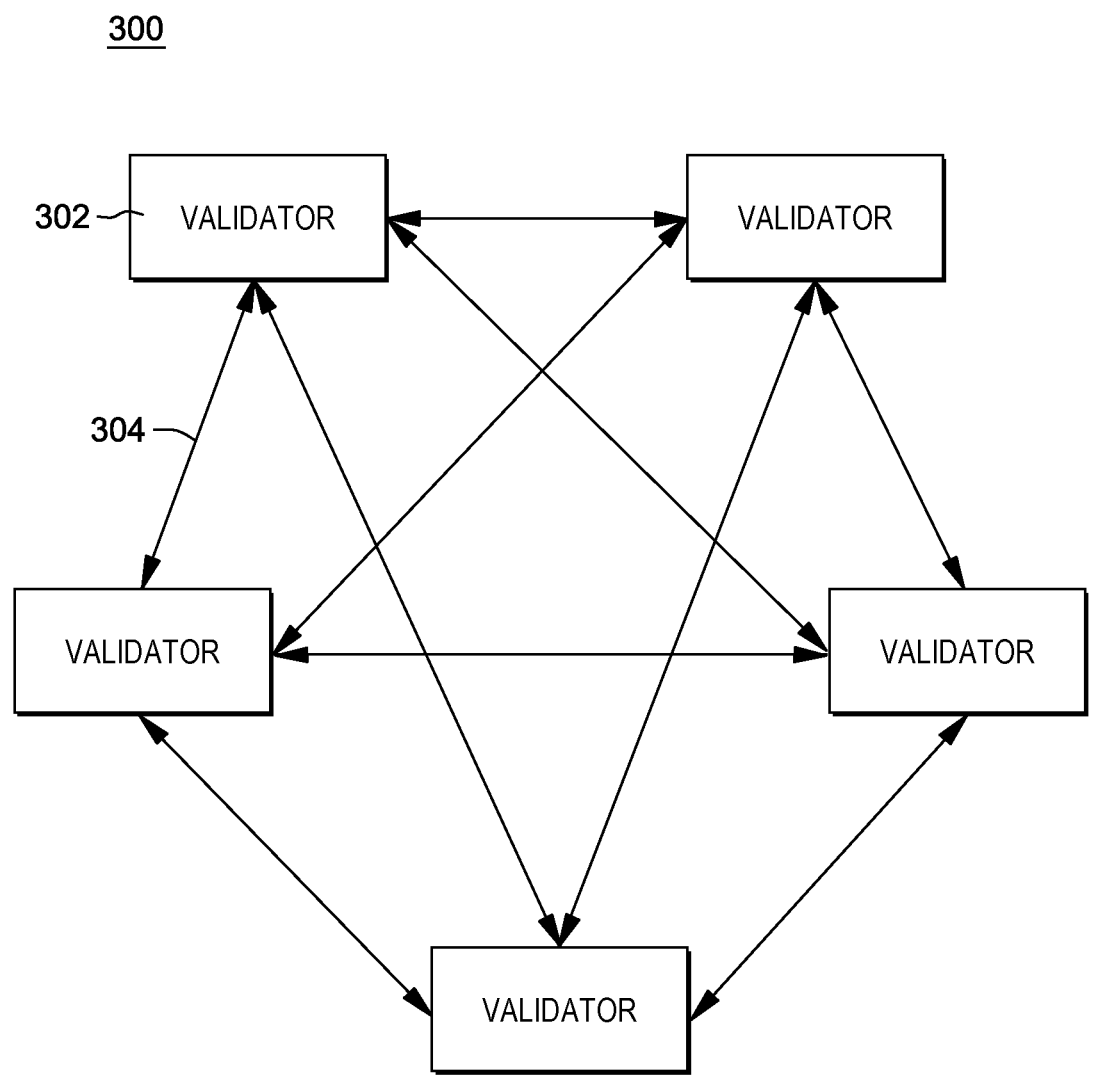
FIG. 3 is a system diagram illustrating validator nodes associated with the blockchain of FIG. 1 in accordance with an aspect of the present disclosure.

With reference now to FIG. 3, any transactions 104 submitted to blockchain 100 are validated by a set of validator nodes 300 associated with blockchain 100. For example, transactions 104 may be transmitted to one or more of the validator nodes 300 and may be shared between the validator nodes 300 for validation and consensus. Each validator node 302 determines whether a transaction 104 is valid and whether the transaction 104 complies with the rules of the blockchain 100. The validator node 302 adds a plurality of the validated transactions 104 to a data block 102 and submits the data block 102 for consensus by all or some of the other validator nodes. The other validator nodes 302 then vote "for" or "against" appending the data block 102 containing the transactions 104 to the blockchain 100. A consensus of the set of validator nodes 300, e.g., a threshold number of identical votes "for" or "against", is required to allow or deny the data block 102 to be appended to the blockchain 100. In some aspects, one or more of nodes 200 may also be validator nodes 302. In some aspects, nodes 200 that are not validator nodes 302 may perform processing such as, for example, receiving transaction submissions, providing member services, handling application programming interface (API) requests from users, or other similar functions. In this manner, the processing power of the validator nodes 302 may be preserved for generating new blocks, reaching consensus, and monitoring the other validator nodes 302. Validator nodes 302 may communicate with one another via communication pathways 304, e.g., wired or wireless connections, over the internet, etc., to transmit and receive data. For example, as new data blocks 102 are generated by validator nodes 302, validator nodes 302 may communicate or share the new data blocks 102 and transmit and receive consensus messages via communication pathways 304.

Figure 4:
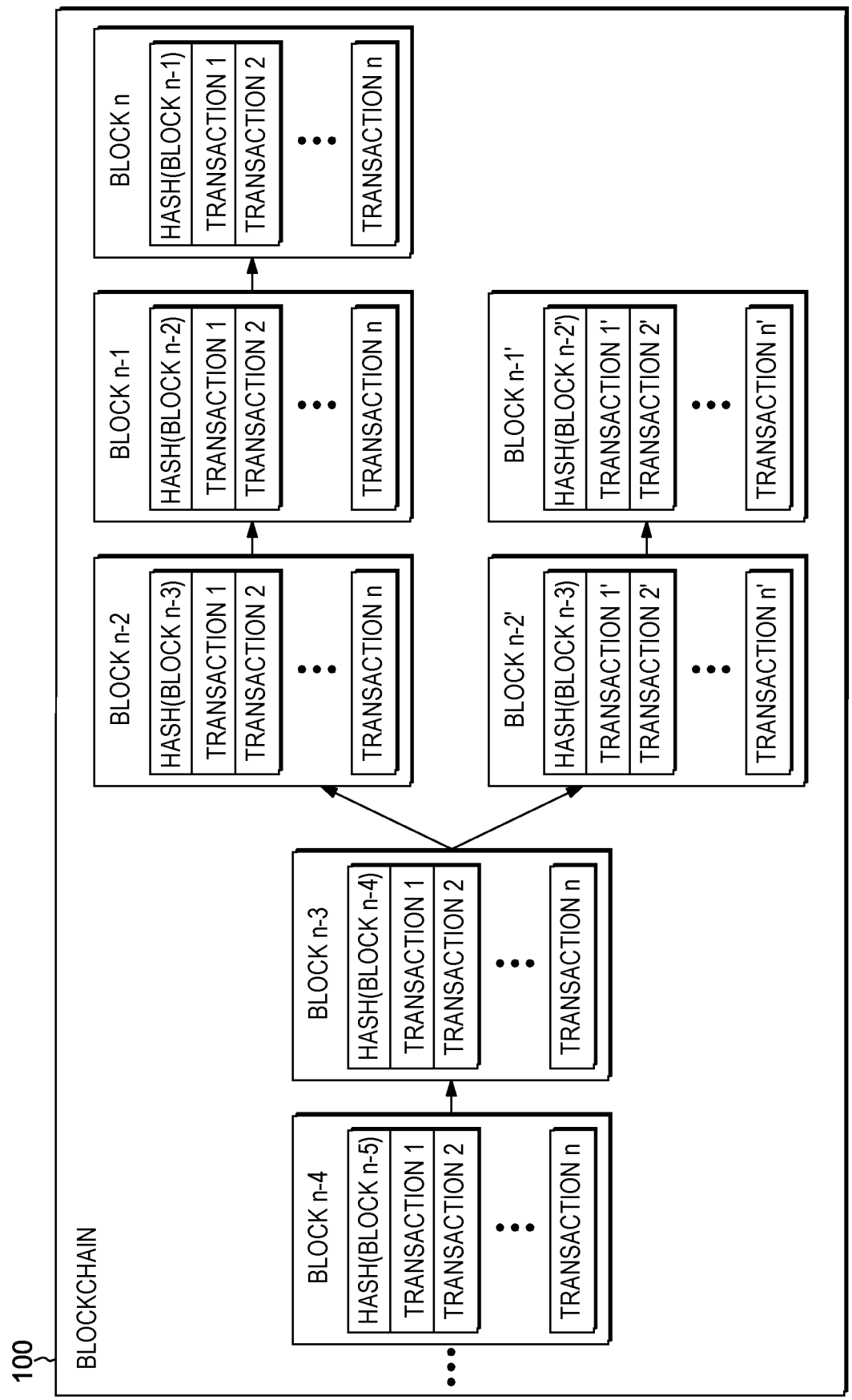
FIG. 4 is a diagram illustrating a fork in the blockchain of FIG. 1 in accordance with an aspect of the present disclosure.

With reference now to FIG. 4, the state of blockchain 100 during a fork is illustrated. Prior to the fork, validators 300 reach a consensus and append blocks n-4 and n-3 to the blockchain. During the consensus round for block n-2, however, a dispute between the validators 300 arises. For example, a portion of the validators may determine that block n-2 is the next block to be appended to blockchain 100 while a second portion of the validators may determine that a block n-2' is the next block to be appended to the blockchain 100. This may occur, for example, due to latency in the network, different versions of software running on the validators 300, or for any other reason. When the first and second portions of validators 300 attempt to append both blocks n-2 and n-2' to blockchain 100 a fork has occurred. In this case block n-2 includes transactions 1 to n in a particular order while block n-2' includes transaction 1' to n' in a particular order. In some aspects, some or all of transactions 1 to n and 1' to n' may be the same transactions. As the fork progresses, the first portion of validators reach a consensus on the addition of a new block n-1 to the side of the fork of blockchain 100 including block n-2 while the second portion of validators reach a consensus on the addition of a new block n-1' to the side of the fork of blockchain 100 including block n-2'. Finally, the first portion of validators reach a consensus on the addition of a new block n to the side of the fork including block n-2 and n-1 prior to the second portion of validators reaching a consensus on a new block for addition to the side of the fork including block n-2' and n-1'. The fork may then be resolved in favor of the side of the fork that is longer, e.g., the side of the fork including blocks n-2, n-1, and n as appended by the first portion of validators and the losing side of the fork may be unwound or orphaned, e.g., the transactions may be canceled, lost, or returned to the pool for later addition to a new block. This may be due to the fact that as each new block is added, the difficulty to add an additional block increases and therefore a larger amount of resources has been spent on the version of the blockchain including blocks n-2, n-1, and n. For example, "unwinding" or "orphaning" the longer side of the fork of the blockchain may result in an exponentially larger amount of lost resources as compared to "unwinding" or "orphaning" the smaller side of the fork of the blockchain. In some aspects, the fork may include a larger or smaller number of appended blocks on each side before the fork is resolved. For example, each side may include one, two, three, four, five, six, seven, or more appended blocks before the fork is resolved.

In some aspects, some or all of transactions 1 to n of block n-1 and 1' to n' of block n-1' may be the same transactions. In some aspects, some or all of transactions 1 to n of block n-1 and 1' to n' of block n-2' may be the same transactions. In some aspects, some or all of transactions 1' to n' of block n-1' and 1 to n of block n-2 may be the same transactions. Because some of the transactions may overlap between the side of the fork of blockchain 100 including blocks n-2 and n-1 and the side of the fork of blockchain 100 including blocks n-2' and n-1' there is a potential for a double-spend attack or in some cases for a transaction to execute out of order or not at all. This may cause a party to be damaged, e.g., in a case where the party has already provided some form of payment or other consideration for a transaction, or delivered goods and/or services according to a transaction that has now been orphaned or canceled.

Under current blockchain implementations, a user that submits a transaction is often left with no recourse when that transaction has been orphaned due to a fork. For example, a common method followed by users of a blockchain is to wait until a threshold number of blocks have been appended, e.g., X number of blocks back, to the blockchain after the block containing a transaction of interest before acting on the transaction. Although this method may confirm that the block is unlikely to be orphaned due to a fork, waiting for multiple blocks to be appended before acting on a transaction may be inefficient. For example, in some instances it may take minutes, hours, or even days for a sufficient number of blocks to be appended to the blockchain to ensure that the transaction is unlikely to be orphaned. This inefficiency may be remedied by providing a fork protection mechanism to users of the blockchain such that the user may proceed with the transaction with the knowledge that even if the transaction is orphaned or lost due to a fork in the blockchain the user's interest in the transaction will be protected.

Figure 5:
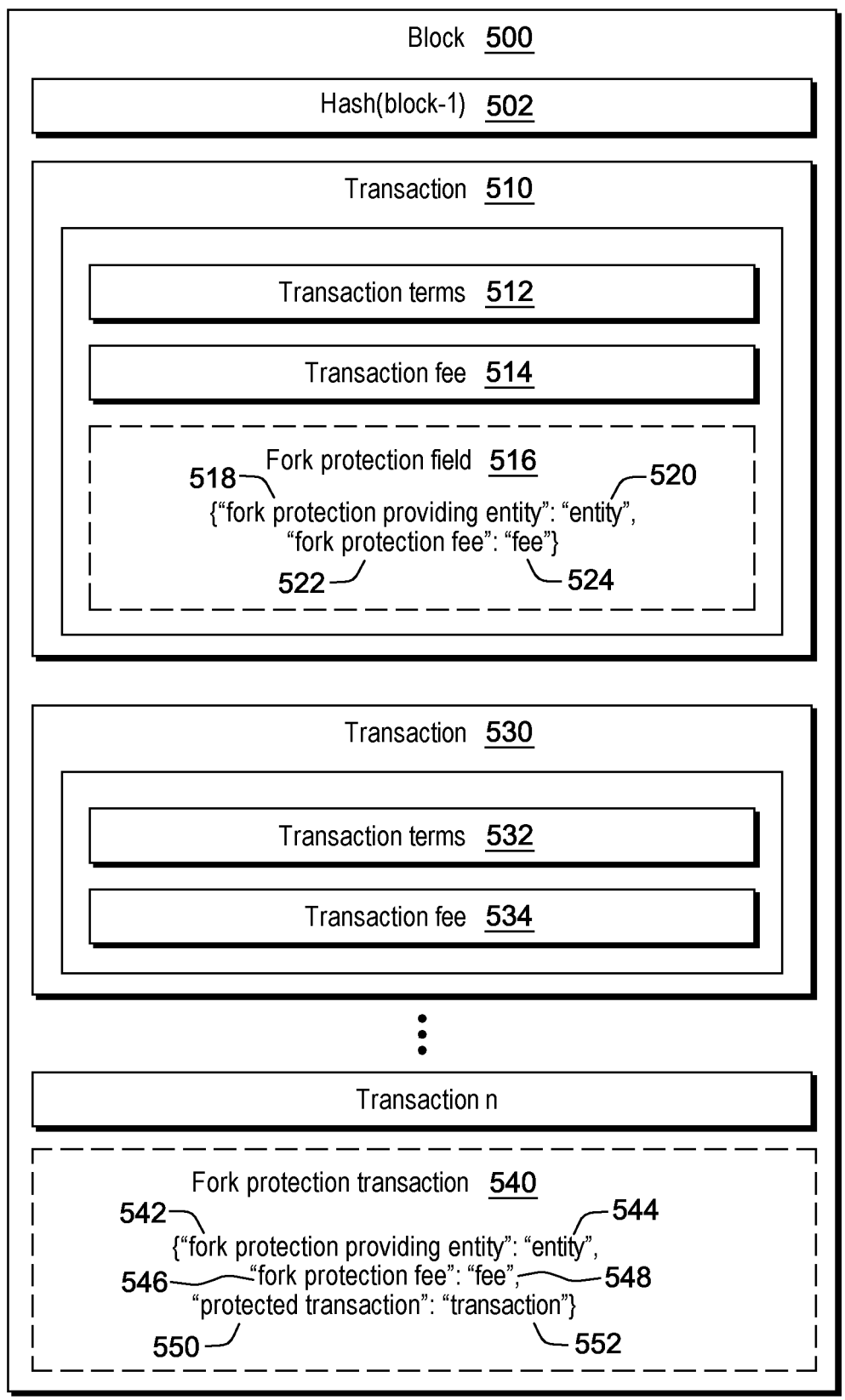
FIG. 5 is a diagram illustrating a block including fork protection in accordance with an embodiment of the present disclosure.

With reference now to FIG. 5, an example block 500 is illustrated. Block 500 includes a hash 502 of the previous block, e.g., block-1, and a plurality of transactions, e.g., transaction 510, transaction 530, . . . , transaction n. Transactions 510 and 530 include respective transaction terms 512, 532, and respective transaction fees 514, 534. Transaction terms 512, 532 may each include the terms of the transaction, for example, how much currency is being transferred, who the currency is being transferred to, a product or service to be delivered in exchange for the transferred currency, or any other transaction or obligation that may be captured in transaction 510, 530.

Transaction fee 514, 534 is a fee that is paid to a successful validator node that generates a block including transaction 510, 530 after the block is appended to blockchain 100. For example, transaction fee 514, 534 may incentivize a validator node 302 to include transaction 510, 530 when generating a new block. In some aspects, for example, a transaction 510, 530 including a small transaction fee 514, 534, or no transaction fee may not be appended to blockchain 100 since the validator nodes 302 have little incentive to include the transaction 510, 530 in a block unless there are no other available transactions that have higher transaction fees. In some aspects, transactions that are submitted for addition to blockchain 100 may be placed in a transaction pool. The validator nodes may select transactions from the transaction pool for inclusion in a newly generated block. In some aspects, the validator nodes may select the transactions from the pool, for example, based on the transaction fee.

In some aspects, transaction 510 may also include a fork protection field 516. Fork protection field 516 identifies a fork protection providing entity, e.g., a validator node providing fork protection, a wallet application providing fork protection (e.g., a user entry portal storing user values and providing access to the blockchain), a third party entity providing fork protection or any other entity that may provide a user with protection from losses due to a fork, and a fork protection fee to be paid to the identified fork protection entity in return for fork protection. In some aspects, for example, fork protection field 516 may be a field submitted as part of transaction 510. In some aspects, fork protection field 516 may include paired protection data including, for example, a pair comprising a fork protection providing entity field 518 and corresponding fork protection providing entity 520, and a pair comprising a fork protection fee field 522 and corresponding fork protection fee amount 524. The fork protection fee amount 524 may be listed, for example, in units of currency, e.g., two units of currency, three units of currency, etc. In some aspects the fork protection fee amount 524 may specify units of currency native to blockchain 100, for example, bitcoins or other similar currency. In some aspects, fork protection fee amount 524 may specify any unit of currency that may be traded or converted on blockchain 100. In some aspects, the fields of fork protection field 516 may be implemented in JavaScript Object Notation (JSON).

In some aspects, a separate fork protection transaction 540 may be submitted for addition to block 500, e.g., to nodes 200 or validator nodes 300 associated with blockchain 500. In some aspects, fork protection transaction 540 may, similar to fork protection field 516, include paired protection data including, for example, a pair comprising a fork protection providing entity field 542 and corresponding fork protection providing entity 544, and a pair comprising a fork protection fee field 546 and corresponding fork protection fee amount 548. In addition, fork protection transaction 540 may also include a pair comprising a protected transaction field 550 and a corresponding identification of the protected transaction 552, e.g., transaction 530. As with fork protection field 516, in some aspects, the fields of fork protection transaction 540 may be implemented using JSON.

In some aspects, fork protection transaction 540 may not be included in the same block as the protected transaction 552. For example, fork protection transaction 540 may have been included in a prior block that was already appended to blockchain 100 or may be included in a block that is appended after the block containing the protected transaction 552. In some aspects, this may occur due to the way the validator nodes 300 package the transactions in the new blocks. In some aspects, the user requesting fork protection may submit the fork protection transaction 540 after the protected transaction 552 has been appended to the blockchain 100. For example, the user may submit the fork protection transaction 540 when the user realizes that the blockchain 100 has forked and that the protected transaction 552 is located in a block found on one of the forks.

When the fork is resolved, any transactions found in the losing version of the blockchain 100 may be orphaned, fail, or may be otherwise lost. For example, transactions found in blocks of the losing version may be returned to the pool.

Figure 6:
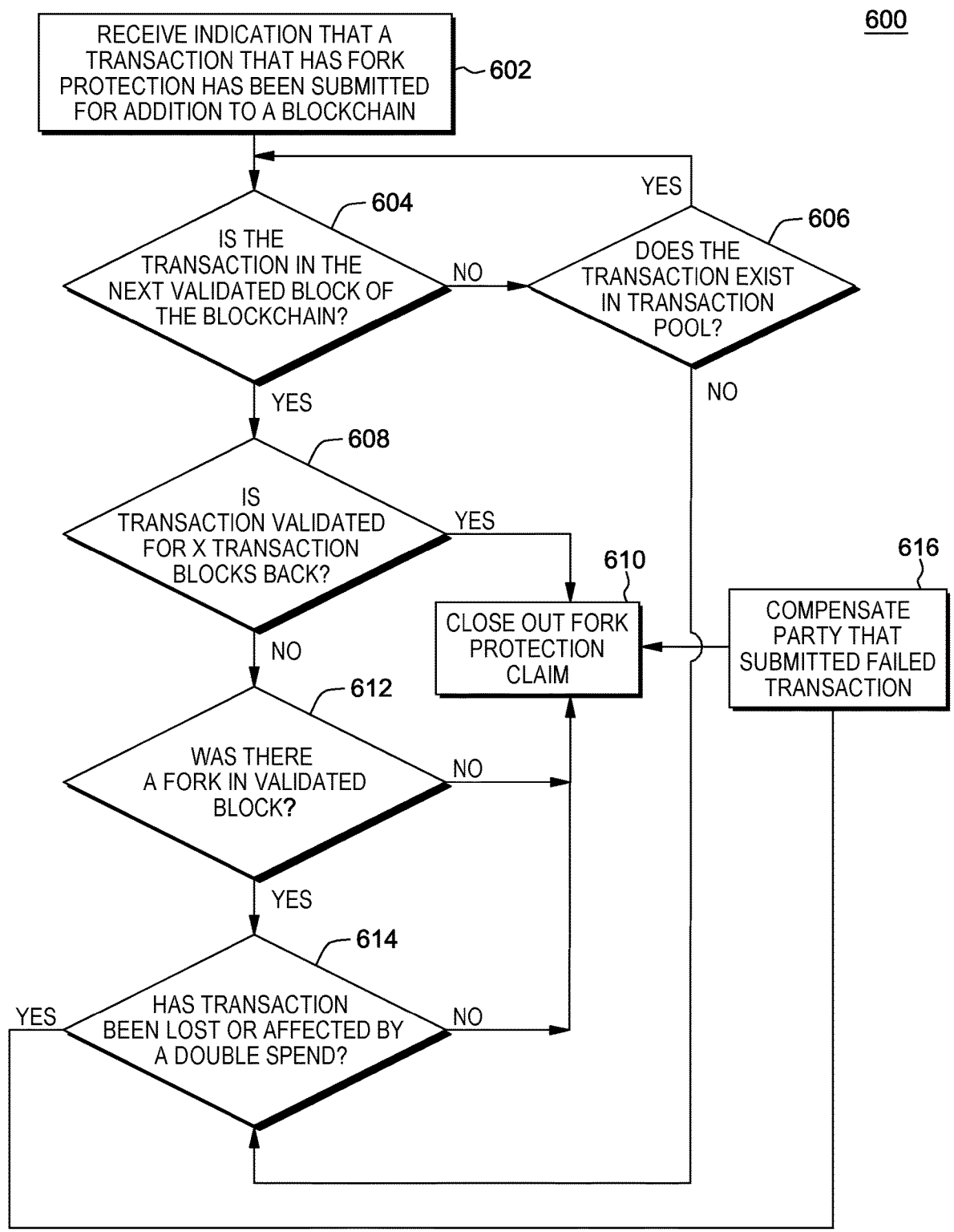
FIG. 6 is a flow chart of a method for providing fork protection according to an aspect of the present disclosure.

With reference now to FIG. 6, a method 600 for determining whether a transaction having fork protection has failed is disclosed. In some aspects, method 600 may be implemented as part of or otherwise associated with blockchain 100, e.g., by nodes 200, validator nodes 300, fork protection entities, or on any other computing device associated with nodes 200, validators, 300, or any other system or entity associated with blockchain 100.

At 602, a notification is received, e.g., by a computing device associated with the fork protection providing party, that a transaction having fork protection has been submitted for addition to a blockchain.

At 604, the computing device may determine whether the transaction has been included in the next validated block of the blockchain.

If the transaction has not been included, the computing device may determine whether the transaction exists in a transaction pool at 606. For example, is the transaction currently located in a transaction pool awaiting selection by a validator node for inclusion in a new block? If the transaction exists in the transaction pool, the method may return to 604.

If the transaction has been included in the next validated block, the computing device determines whether the transaction has been validated for X transaction blocks back at 608. For example, the computing device may determine whether X number of blocks have been appended to the blockchain after the transaction whose hashes are based in part on the block containing the transaction. In some aspects, for example, X may be based on a speed of the blockchain, length of the blockchain, or any other consideration. For example, X may be four blocks, five blocks, or any other number of blocks that a party or entity may determine to be sufficient for ensuring that the block will not be part of a losing fork.

If the transaction has been validated for X transaction blocks back, the fork protection claim may be closed out and method 600 may end at 610.

If the transaction has not been validated for X transaction blocks back, the computing device may determine whether there was a fork in the blockchain at 612.

If there was no fork, the fork protection claim may be closed out and method 600 may end at 610.

If the computing device determines that there was a fork or if the transaction does not exist in the transaction pool (at 606), the computing device may determine whether the transaction has failed, e.g., been lost or affected by a double spend, at 614.

If the transaction has not failed, the fork protection claim may be closed out and method 600 may end at 610.

If the transaction has failed, the party that submitted the transaction having the fork protection may be compensated at 616 and the fork protection claim may be closed out at 610. For example, the party that submitted the transaction having the fork protection may be compensated for any loss due to the failure of the transaction.

Figure 7:
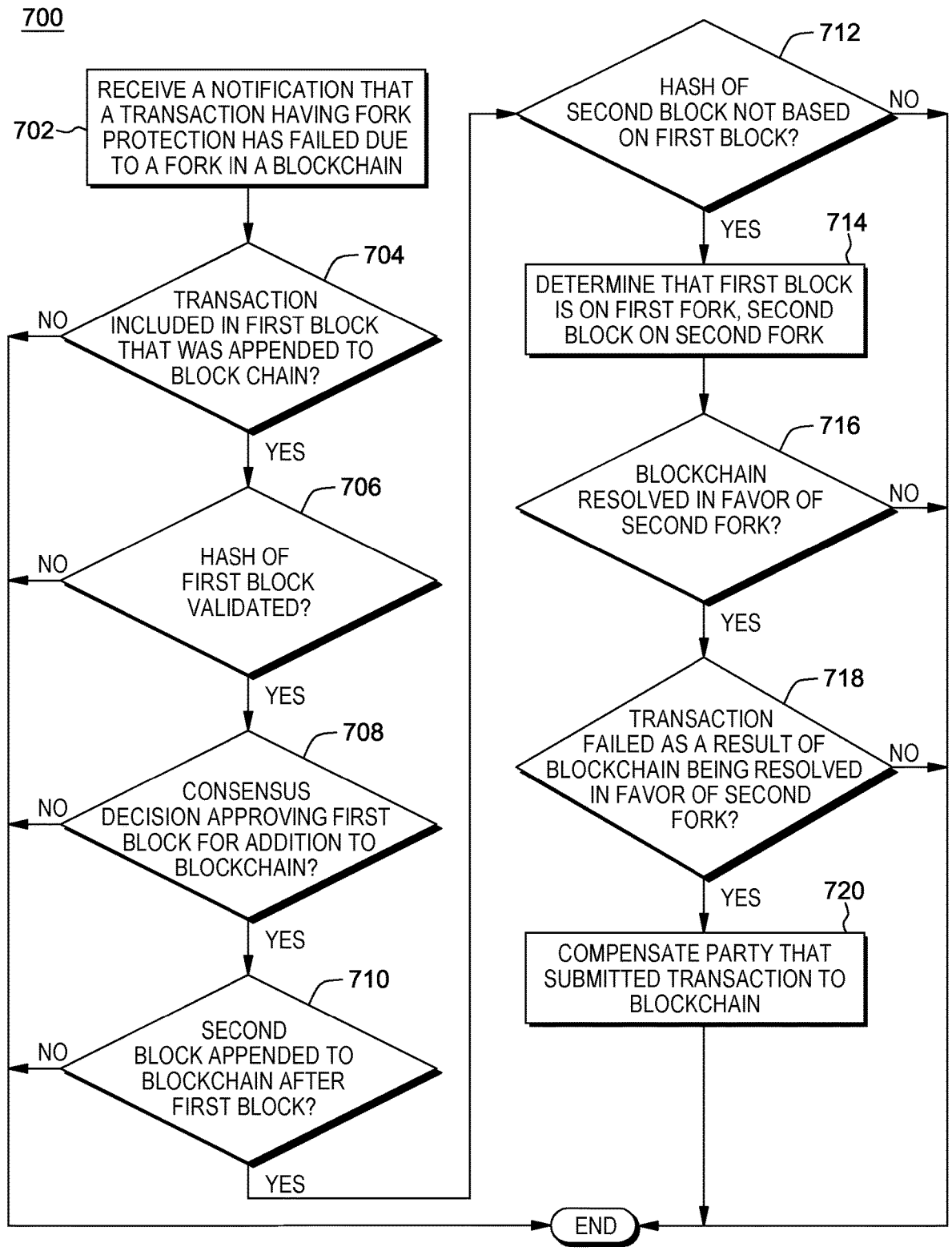
FIG. 7 is a flow chart of another method for providing fork protection according to an aspect of the present disclosure.

Referring now to FIG. 7, a method for providing automatic fork protection in a blockchain is disclosed. At 702, a notification that a transaction having fork protection has failed due to a fork in a blockchain is received, e.g., by a computing device associated with a fork protection providing party.

At 704, the computing device determines whether the transaction having fork protection was included in a first block that was appended to the blockchain. If the computing device determines that the transaction was not included in the first block, the method ends.

At 706, if the transaction was included, the computing device determines whether the hash of the first block was validated. If the computing device determines that the hash was not validated, the method ends.

At 708, if the hash of the first block was validated, the computing device determines whether a consensus decision was made by validator nodes associated with the blockchain approving the first block for addition to the blockchain. If the computing device determines that a consensus decision approving the first block was not made, the method ends.

At 710, if the computing device determines that the consensus decision was made, the computing device determines whether a second block was appended to the blockchain after the first block was appended to the blockchain. If the computing device determines that a second block was not appended, the method ends.

At 712, if the computing device determines that a second block was appended to the blockchain, the computing device determines whether the second block comprises a hash that was not based on the first block. If the computing device determines that the hash of the second block was based on the first block, the method ends.

At 714, if the computing device determines that the second block comprises a hash that was not based on the first block, the computing device determines that the first block was on a first fork of the blockchain and the second block was on a second fork of the blockchain based on the second block comprising a hash that is not based on the first block.

At 716, the computing device determines whether the blockchain was resolved in favor of the first or second fork. If the blockchain was resolved in favor of the first fork, e.g., the fork containing the transaction, the method ends.

At 718, if the computing device determines that the blockchain was resolved in favor of the second fork, e.g., the fork containing the second block, the computing device determines whether the transaction failed as a result of the blockchain being resolved in favor of the second fork. If the computing device determines that the transaction did not fail as a result of the blockchain being resolved in favor of the second fork, the method ends.

At 720, if the computing device determines that the transaction did fail as a result of the blockchain being resolved in favor of the second fork, the computing device compensates the party that submitted the transaction based on the terms of the fork protection.

Figure 8:
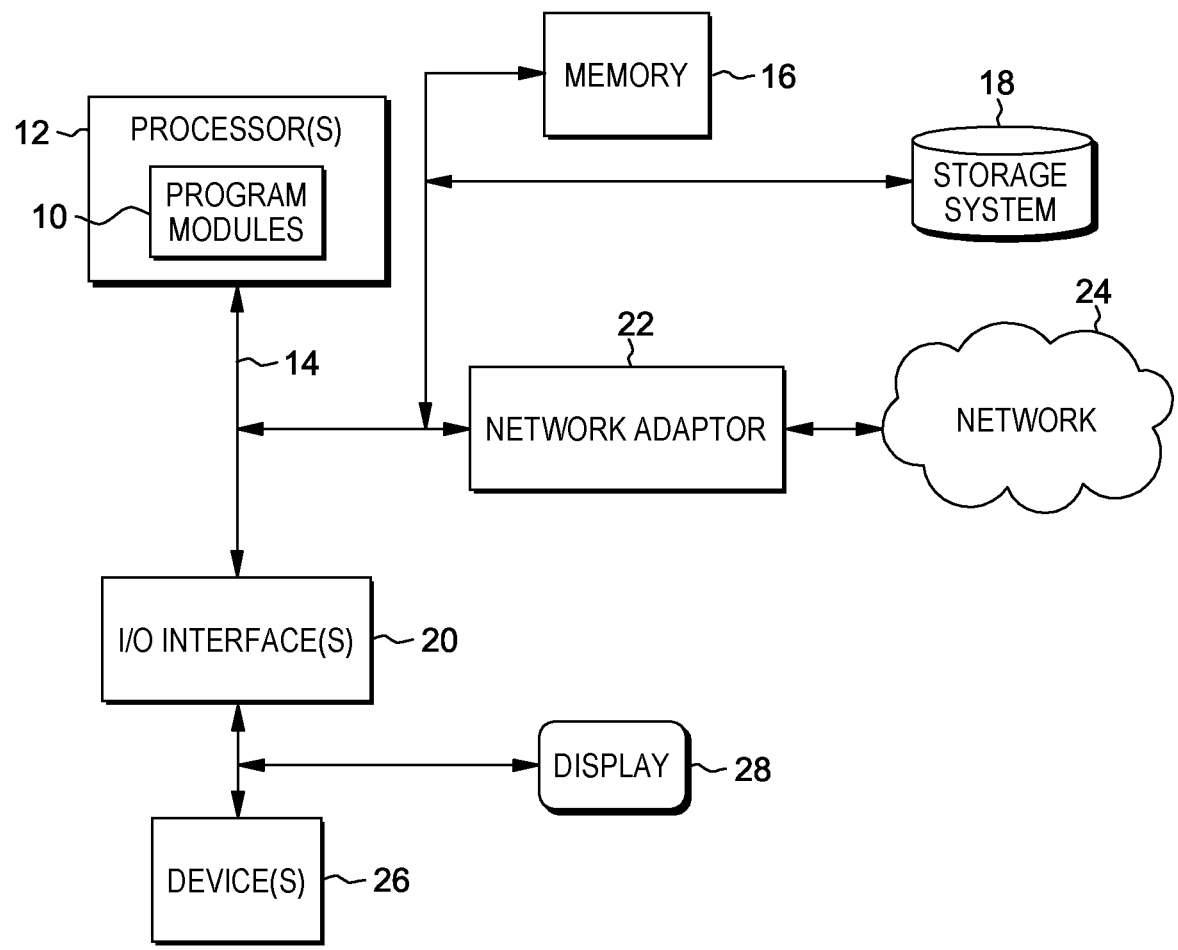
FIG. 8 is an exemplary block diagram of a computer system in which processes involved in the system, method, and computer program product described herein may be implemented.

FIG. 8 illustrates a schematic of an example computer or processing system that may implement any portion of blockchain 100, nodes 200, validators 300, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system.

Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-based method comprising:

accessing, by a hardware processor, a transaction database shared by multiple computing nodes participating in a system based on a blockchain protocol, the transaction database including transactions and blocks, where the transactions are data to be stored in a blockchain data structure and the blocks are records that confirm a timing of appending a transaction as part of the blockchain, said blockchain including a first block including a transaction associated with a user, said first block having been validated by said participating multiple computing nodes;

detecting, by the hardware processor, an occurrence of a fork in the blockchain data structure, said fork defining first and second branches of transactions and blocks, a first branch of said fork including said first block associated with the user and the second branch of said fork including another version of said first block with said transaction associated with the user, said detecting comprising determining that a hash of a second block appended to said blockchain after said first block is not based on said first block at said first branch;

receiving, at the hardware processor, from said multiple computing nodes, a resolution by said multiple computing nodes in favor of one of: said first branch or said second branch of said fork;

determining by the hardware processor, that the first block and corresponding validated transaction associated with said user included in the blockchain structure has failed as being part of the first branch of said fork not favorably resolved by said multiple computing nodes;

determining, by the hardware processor, a further block in said block chain data structure associated with a separate transaction having a transaction term comprising a fork protection field identifying the transaction associated with the user in said first block and identifying a fork protection providing entity providing a fork protection for said identified transaction;

responsive to determining the first block and corresponding transaction associated with said user included in the blockchain structure has failed, automatically communicating, based on the fork protection field, a claim to a computer system of said identified fork protection providing entity showing the validated transaction in the first block that has failed;

automatically receiving, by the hardware processor, responsive to said claim, a new transaction for entry in the blockchain, the new transaction including a term indicating a transfer of compensation from the fork protection providing entity to the user in a currency associated with the blockchain for at least a portion of a loss suffered by the user due to the failure of the validated transaction as a result of the fork occurrence.

2. The computer-based method of claim 1, wherein determining that the transaction failed as a result of the first branch not being favorably resolved comprises determining that a value used for the validated transaction was double spent by a transaction found in a block appended to the second branch of the fork of the blockchain.

3. The method of claim 1, wherein determining that the transaction failed as a result of the blockchain being resolved in favor of the second branch of the fork comprises determining that the transaction was lost.

4. The method of claim 3, wherein determining that the transaction was lost comprises:

determining that the transaction returned to a transaction pool of the blockchain; and determining that the transaction was not selected for addition to new block by a validator node of the blockchain within a pre-determined period of time after being returned to the transaction pool.

5. The method of claim 1, wherein the validated transaction further comprises a fork protection fee field, the fork protection fee field indicating a fee in said associated blockchain currency paid to the fork protection providing entity.

6. The method of claim 1, wherein the fork protection field in the separate transaction identifies:

the validated transaction submitted for addition to the blockchain by the user;

the fork protection providing entity; and a fork protection fee paid to the fork protection providing entity by the user that submitted the transaction for addition to the blockchain.

7. An automated fork protection system for providing automatic fork protection in a blockchain comprising:

at least one hardware processor configured to:

access a transaction database shared by multiple computing nodes participating in a system based on a blockchain protocol, the transaction database including transactions and blocks, where the transactions are data to be stored in a blockchain data structure and the blocks are records that confirm a timing of appending a transaction as part of the blockchain, said blockchain including a first block including a transaction associated with a user, said first block having validated by said participating multiple computing nodes;

detect an occurrence of a fork in the blockchain data structure, said fork defining first and second branches of transactions and blocks, a first branch of said fork including said first block associated with the user and the second branch of said fork including another version of said first block with said transaction associated with the user, said detecting comprising determining that a hash of a second block appended to said blockchain after said first block is not based on said first block at said first branch;

receive from said multiple computing nodes responsive to the detected occurrence of a fork in the blockchain data structure a resolution by said multiple computing nodes in favor of one of: said first branch or said second branch of said fork;

determine that the first block and corresponding validated transaction associated with said user included in the blockchain structure has failed as being part of the first branch of said fork not favorably resolved by said multiple computing nodes;

determine a further block in said block chain data structure associated with a separate transaction having a transaction term comprising a fork protection field identifying the transaction associated with the user in said first block and identifying a fork protection providing entity providing a fork protection for said identified linked transaction;

in response to determining the first block and corresponding transaction associated with said user included in the blockchain structure has failed, automatically communicating, based on the fork protection field, a claim to a computer system of said identified fork protection providing entity showing the validated transaction in the first block that has failed; and automatically receive, responsive to said claim, a new transaction for entry in the blockchain, the new transaction including a term indicating a transfer of compensation from the fork protection providing entity to the user in a currency associated with the blockchain for at least a portion of a loss suffered by the user due to the failure of the validated transaction as a result of the fork occurrence.

8. The system of claim 7, wherein determining that the transaction failed as a result of the first branch not being favorably resolved comprises determining that a value used for the validated transaction was double spent by a transaction found in a block appended to the second branch of the fork of the blockchain.

9. The system of claim 7, wherein determining that the transaction failed as a result of the blockchain being resolved in favor of the second branch of the_fork comprises determining that the transaction was lost.

10. The system of claim 9, wherein determining that the transaction was lost comprises:
    determining that the transaction returned to a transaction pool of the blockchain; and
    determining that the transaction was not selected for addition to new block by a validator node of the blockchain within a pre-determined period of time after being returned to the transaction pool.

11. The system of claim 7, wherein the validated transaction further comprises a fork protection fee field, the fork protection fee field indicating a fee paid in said associated blockchain currency to the fork protection providing entity.

12. The system of claim 7, wherein the fork protection field in, the separate transaction identifies:
    the validated transaction submitted for addition to the blockchain by the user;
    the fork protection providing entity; and
    a fork protection fee paid to the fork protection providing entity by the user that submitted the transaction for addition to the blockchain.

13. A non-transitory computer readable medium comprising instructions that, when executed by at least one hardware processor of a computer-system, configure the at least one hardware processor to:
    access a transaction database shared by multiple computing nodes participating in a system based on a blockchain protocol, the transaction database including transactions and blocks, where the transactions are data to be stored in a blockchain data structure and the blocks are records that confirm a timing of appending a transaction as part of the blockchain, said blockchain including a first block including a transaction associated with a user, said first block having validated by said participating multiple computing nodes;
    detect an occurrence of a fork in the blockchain data structure, said fork defining first and second branches of transactions and blocks, a first branch of said fork including said first block associated with the user and the second branch of said fork including another version of said first block with said transaction associated with the user, said detecting comprising determining that a hash of a second block appended to said blockchain after said first block is not based on said first block at said first branch;
    receive from said multiple computing nodes responsive to the detected occurrence of a fork in the blockchain data structure a resolution by said multiple computing nodes in favor of one of: said first branch or said second branch of said fork;
    determine that the first block and corresponding validated transaction associated with said user included in the blockchain structure has failed as being part of the first branch of said fork not favorably resolved by said multiple computing nodes;
    determine a further block in said block chain data structure associated with a separate transaction having a transaction term comprising a fork protection field identifying the transaction associated with the user in said first block and identifying a fork protection providing entity providing a fork protection for said linked identified transaction;
    in response to determining the first block and corresponding transaction associated with said user included in the blockchain structure has failed, automatically providing communicating, based on the fork protection field, a claim to a computer system of said identified fork protection providing entity showing the validated transaction in the first block that has failed;
    automatically receive, responsive to said claim, a new transaction for entry in the blockchain, the new transaction including a term indicating a transfer of compensation from the fork protection providing entity to the user in a currency associated with the blockchain for at least a portion of a loss suffered by the party user due to the failure of the validated transaction as a result of the fork occurrence.

14. The non-transitory computer readable medium of claim 13, wherein determining that the transaction failed as a result of the first branch not being favorably resolved comprises determining that a value used for the validated transaction was double spent by a transaction found in a block appended to the second branch of the fork of the blockchain.

15. The non-transitory computer readable medium of claim 13, wherein determining that the transaction failed as a result of the blockchain being resolved in favor of the second branch of the_fork comprises determining that the transaction was lost.

16. The non-transitory computer readable medium of claim 15, wherein determining that the transaction was lost comprises:
    determining that the transaction returned to a transaction pool of the blockchain; and
    determining that the transaction was not selected for addition to new block by a validator node of the blockchain within a pre-determined period of time after being returned to the transaction pool.

17. The non-transitory computer readable medium of claim 13, wherein the validated transaction further comprises a fork protection fee field, the fork protection fee field indicating a fee paid in said associated blockchain currency to the fork protection providing entity.

18. The non-transitory computer readable medium of claim 13, wherein the fork protection field in the separate transaction identifies:
    the validated transaction submitted for addition to the blockchain by the user;
    the fork protection providing entity; and
    a fork protection fee paid to the fork protection providing entity by the user that submitted the transaction for addition to the blockchain.

* * * * *